United States Patent [19]

Lee et al.

[11] 4,301,327

[45] Nov. 17, 1981

[54] REDUCTION OF MESSAGE REDUNDANCY BY MULTIPLE SUBSTITUTION: A MESSAGE PREPROCESSING SCHEME FOR SECURE COMMUNICATIONS

[76] Inventors: Lin-nan Lee, 18515 Eagles Roost Dr., Germantown, Md. 20767; Shyue-Ching Lu, P.O. Box 71, Chung-Li Taiwan 320, Taiwan

[21] Appl. No.: 45,706

[22] Filed: Jun. 5, 1979

[51] Int. Cl.³ .............................................. H04K 9/00
[52] U.S. Cl. .................................. 178/22.10; 364/900
[58] Field of Search ............... 375/2; 178/22; 364/900

[56] References Cited

U.S. PATENT DOCUMENTS

| 4,068,089 | 1/1978 | Kuhnlein et al. | 178/22 |
| 4,124,843 | 11/1978 | Bramson et al. | 364/900 |
| 4,157,454 | 6/1979 | Becker | 178/22 |

Primary Examiner—Howard A. Birmiel
Attorney, Agent, or Firm—Sughrue, Mion, Zinn, Macpeak & Seas

[57] ABSTRACT

The strength of a cryptosystem is increased by providing multiple characters for one or more of the characters being encoded to thereby reduce redundancy.

9 Claims, 2 Drawing Figures

REDUCTION OF MESSAGE REDUNDANCY BY MULTIPLE SUBSTITUTION: A MESSAGE PREPROCESSING SCHEME FOR SECURE COMMUNICATIONS

BACKGROUND OF THE INVENTION

This invention relates to cryptosystems, and more particularly to a technique for strengthening a cryptosystem without substantially increasing the complexity thereof.

In modern communications, it is often desirable to communicate in secrecy, and it is common practice to encode, or encipher, a message prior to transmission and to then decode, or decipher, the received cryptogram in order to obtain the original message. In many cases, the security requirements are not substantial and, therefore, relatively simple cryptosystems will suffice. However, in some applications, a very high degree of communication security is required, and a cryptosystem must be employed which is substantially immune to cryptanalysis.

Standard techniques for achieving the desired high degree of communication security have emphasized the design of the encipherer and decipherer. Some employ highly complex encryption algorithms and are, from a practical viewpoint, immune to a cryptanalysis attack. However, such an encryption algorithm will require rather complex and costly encipherer/decipherer equipment. When anything but the highest level of security is required, the use of such complicated equipment may not be warranted.

An alternative technique is the use of a source coding scheme. It has been pointed out by C. E. Shannon, "Communication Theory of Secrecy Systems," Bell System Technical Journal, Vol. 28, pages 656-715, Oct. 1949, that the number of cryptogram letters (which he refers to as the "unicity distance"), needed to successfully cryptoanalyze a cryptogram is inversely proportional to the message redundancy. Thus, the security of a cryptosystem could be strengthened by using a good source coding scheme which actually reduces the redundancy of the messages. If the prime concern is to deceive the cryptanalyst the cryptosystem can be strengthened by modifying the appearance of the messages, and a few source coding schemes such as the Huffman codes and run-length codes discussed by R. G. Gallager, *Information Theory and Reliable Communication*, John Wiley & Sons, N.Y. 1968, have been studied in greater detail. Not only can these source coding schemes reduce the redundancy of the messages, but their main objective is the reduction of the band width requirements of the communication channel. These complicated source coding schemes, however, suffer from the same disadvantage as the very complicated enciphering and deciphering techniques in that they are rather complex and costly and, in many applications, are not warranted by the security requirements. If the channel bandwidth is available, the primary function of these source coding schemes, i.e., the reduction in the bandwidth requirements of the communication channel, is no longer needed and the use of these source coding schemes purely for the purpose of increasing communication security may constitute an "overkill".

SUMMARY OF THE INVENTION

It is an object of this invention to increase the security of a cryptosystem by decreasing the message redundancy.

It is a further object of this invention to decrease the message redundancy without the use of complicated source coding scheme.

It is a still further object of this invention to obtain reduced redundancy in a cryptosystem without requiring the use of complicated enciphering/deciphering equipment.

Briefly, these and other objects are achieved according to the present invention by a message preprocessing technique in which the most likely characters in the alphabet of the message being encoded are replaced by two or more new characters having equal probability. The number of multiple substitutions is limited by the maximum acceptable size of the newly generated alphabet and the number of permissible substitutions are distributed throughout the alphabet in order to optimize the "pseudoredundancy" of the message, i,e., the message redundancy which is apparent to the cryptanalyst.

BRIEF DESCRIPTION OF THE DRAWINGS

The present invention will be more clearly understood with reference to the following description in conjunction with the accompanying drawings in which.

DETAILED DESCRIPTION OF THE INVENTION

According to the present invention, the redundancy of an enciphered message is decreased by merely substituting multiple characters for the most redundant characters in the original alphabet of the message. In this way, the original message contents remain unchanged, but the size of the alphabet is merely expanded. It will then be necessary to use at least the same channel bandwidth to transmit the expanded message, and in many cases the bandwidth requirements will be increased. Thus, the present invention is directed to applications in which at least some bandwidth expansion is permitted.

Figure 1:
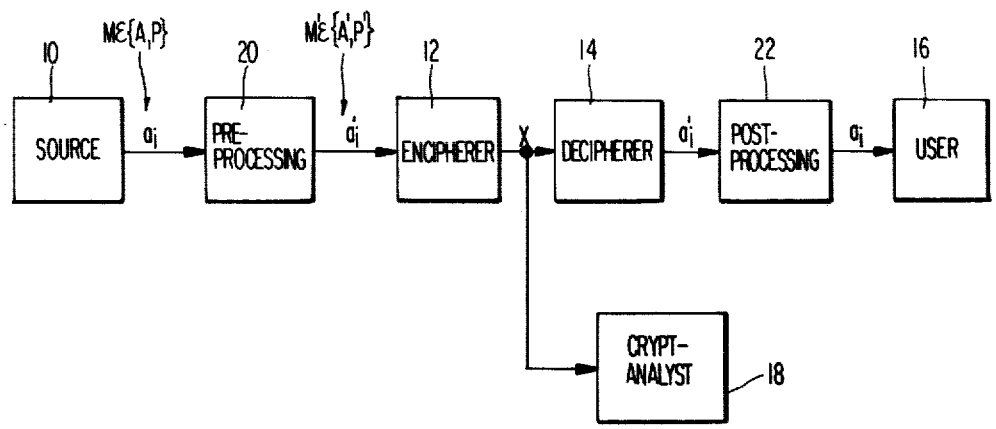
FIG. 1 is a block diagram of a cryptosystem utilizing the preprocessing scheme according to the present invention.

FIG. 1 is a block diagram of a cryptosystem utilizing the technique according to the present invention. In a conventional cryptosystem, a source 10 sends a message stream m to an encipherer 12 which transmits the encoded message to a decipherer 14. The decipherer 14 determines the original message and provides it to the user 16. The cryptanalyst 18 may gain access to the message in its encoded form, and it would be desirable to make the encoded message as secure as possible without unduly complicating the overall system. This is done through the use of a preprocessor 20 and postprocessor 22.

The message emitted from source 10 uses an alphabet $A = (a_1, a_2, \ldots a_n)$, and there is associated with each letter $a_i$ in the alphabet A a letter probability $P_i$. The set of letter probabilities $P = (p_1, p_2, \ldots, p_n)$ satisfies the usual constraints of a well-defined probability set, i.e., $$P_i > 0, \ 1 \leq i \leq n$$

and $$\sum_{i=1}^{n} p_i = 1$$

In the preprocessor 20, each letter $a_i$ in the original alphabet A has been assigned a disjoint subset $A'_i$ of an alphabet $A'$. The preprocessor determines the subset $A'_i$ corresponding to each received letter $a_i$ and randomly selects one of the letters in this subset. The output of the preprocessor 20 will be a new message stream m' consisting of letters $a'_i$ belonging to a new alphabet $A'$. The alphabet $A'$ has a larger number of characters than the original alphabet A and, through the proper selection of substitutions, has a more uniform set of probability P'. The encipherer 12 receives this modified message stream and provides at its output a cryptogram x of the modified message stream. The decipherer 14 deciphers the cryptogram and provides at its output the modified message stream m' and the postprocessor 22 performs substantially the inverse of the operation of preprocessor 20 to provide to the user the original message stream m.

One example of a suitable preprocessor would be a read only memory (ROM) in which the original letters $a_i$ would address memory locations at which the corresponding subsets $A'_i$ are stored. A random number generator could be used to select one of the available letters $a'_i$ from the addressed subset. The postprocessor would then be a similar ROM which would contain a simple look-up table and would provide at its output the particular letter $a_i$ which corresponds to the received letter $a'_i$.

The redundancy of the original message stream m, as defined by C. E. Shannon in the above-referenced publication, is given by $$r_{[A,P]} = \log n - h_{[A,P]},  \quad (1)$$

where $h_{[A,P]}$ is the entropy of the source and is given by $$h_{[A,P]} = - \sum_{i=1}^{n} p_i \log p_i,  \quad (2)$$

and the logarithm functions are taken over base two. The message preprocessor accepts the messages stream m, and converts it to an expanded message stream m' with an alphabet $A' = [a'_1, a'_2, \ldots, a'_t]$, and a set of letter probabilities $P' = [p'_1, p'_2, \ldots, p'_t]$, such that the pseudo-redundancy of the expanded message stream $$r_{[A',P']} = \log t - h_{[A',P']}  \quad (3)$$

is as small as possible.

In general, the pseudo-redundancy of a message stream can be reduced to 0 if the letter probabilities of the message source are rational numbers. If so, there will exist a common denominator d and integers $e_i$ such that $$P_i = e_i/d, \text{ for } 1 \leq i \leq n.$$

We could then choose an alphabet $A'$ having a size d and partition it into n subsets with the i-th subset containing $e_i$ letters. The probability of each letter within the alphabet $A'$ would be $1/d$, and the pseudo-redundancy would therefore be minimized.

From a practical point of view, however, this approach may be unacceptable since it will probably result in considerable bandwidth expansion. Since the redundancy of the message stream cannot be reduced to 0 without unacceptably increasing the bandwidth, a maximum alphabet size must be chosen and the limited number of substitutions permitted by this maximum alphabet size must be properly used so that the minimum redundancy for a given alphabet size may be achieved. This will be hereinafter referred to as "optimal partial expansion".

A first technique for achieving optimal partial expansion is as follows.

Let $A = [a_1, a_2, \ldots, a_n]$ be the source alphabet, and $P = [p_1, p_2, \ldots, p_n]$ be the corresponding probabilities. If $n+1$ is the desired size for the expanded alphabet $A^1$, a simple multiple substitution scheme is to partition the alphabet into n disjoint subsets $A^1 = [A_1^1, A_2^1, \ldots, A_n^1]$ and establish a one-to-one correspondence between a letter in A and a subset in $A^1$ for all letters in A. [Here the superscript "1" is used to indicate that the size of the new alphabet is one greater than the original source alphabet.] Naturally, among the n subsets in $A^1$, $n-1$ of them contain a single letter in $A^1$, and only one of them contains two letters. Without loss of generality, let $A_i^1 = [a_i^1]$ for $1 \leq i \leq n-1$, and $A_n^1 = [a_n^1, a_{n+1}^1]$. As a result, we have $$p_i^1 = p_i, \text{ for } 1 \leq i \leq n-1  \quad (4a)$$

and $$p_n^1 + p_{n+1}^1 = p_n.  \quad (4b)$$

To minimize the pseudo-redundancy for $A^1$, we must maximize the entropy $$h_{[A1,p1]} = - \sum_{i=1}^{n+1} p_i^1 \log p_i^1.  \quad (5)$$

By substituting Eq. (4a) and (4b) into (5), and differentiating both sides with respect to $p_n^1$, it can be easily shown that the choice of $$p_n^1 = p_{n+1}^1 = p_n/2  \quad (6)$$

maximizes $h_{[A1,P1]}$ for a given $p_n$. The reduction of pseudo-redundancy, $$\Delta r = r_{[A1,P1]} - r_{[A,P]},$$

assuming the letters are not all equally likely, is given by $$\Delta r = \log (n+1/n - p_n.  \quad (7)$$

From Eq. (7), it is obvious that the reduction is maximized if the most likely letter in A is substituted by two letters in $A^1$ with equal probability.

With this technique, an alaphabet A of size n can be expanded to another alphabet $A^1$ of size $n+1$, to achieve the maximum reduction of pseudo-redundancy possible with a single substitution, and it is possible to apply the technique recursively to expand the alphabet to an arbitrary size t. Clearly, if the most likely letter $a_i^1$ in $A^1$ is the only letter in its subset $A_i^1$, one may consider the alphabet $A^1$ as another source alphabet, and the technique seems readily applicable. On the other hand, if the most likely letter $a_i^1$ in A is not the only letter in its subset $A_i^1$, all letters in the subject must be considered. In general, we have an intermediate alphabet $A^k = [A_1^k, A_2^k, \ldots, A_n^k]$, where any letter in a subset $A_i^k$ can be used as a substitute for the letter $a_i$ in the alphabet A. [Here again, the superscript "k" is used to indicate that the new alphabet is k letters greater than the original source alphabet.] If the partition of the disjoint subsets is fixed, and $P = [p_1^k, p_2^k, \ldots, p_{n+k}^k]$ are the letter probabilities, we have $$\sum_{a_j^k \epsilon A_i^k} p_j^k = p_i \text{ for } 1 \leq i \leq n. \tag{8}$$

For an expanded alphabet $A^k$ of size $n+k$, $k > 0$, and a given partition $A^k = [A_1^k, A_2^k, \ldots, A_n^k]$, the pseudo-redundancy is minimized if the letter probabilities of $A^k$ satisfy $$p_j^k = p_i/l_i^k \text{ for all } a_j^k \epsilon A_i^k, 1 \leq i \leq n, \tag{9}$$

where $l_i^k$ is the number of letters in $A_i^k$.

To form a successful recursive algorithm, the optimal partition for the new alphabet must be determined whenever the size of the alphabet is incremented by one. If the most likely letter $a_i^k$ in $A^k$ is the only letter in its subset $A_i^k$, the optimal partition for $A^{k+1}$ should contain two letters in the subset $A_i^{k+1}$, and the number of letters in any other subset $A_j^{k+1}$, $j \neq i$, $1 \leq j \leq n$, should be identical to that in $A_j^k$. In other words, if a letter in $A_i^k$ is the most likely in $A^k$, and $l_i^k = 1$, the optimal partition for $A^{k+1}$ is $$l_i^{k+1} = 2,$$

and $$l_j^{k+1} = l_j^k \text{ for } 1 \leq j \leq n, j \neq i.$$

In general, however, the subset containing the most likely letter in $A^k$ may have more than one letter. Intuitively, it seems possible to apply the same technique recursively. For example, if $A^k = [A_1^k, A_2^k, \ldots, A_n^k]$ is the partition for alphabet $A^k$, and letters $a_j^k \epsilon A_i^k$ are the most likely letters in $A^k$, one may choose to expand $A^k$ by adding one new letter to $A_i^k$ to form $A^{k+1}$. Unfortunately, this procedure does not always lead to the optimal solution, as can be shown by the following example.

EXAMPLE I

Let A be a three letter alphabet, and let its letter probabilities be $P = [0.597, 0.300, 0.103]$. The optimal expansion for a four letter alphabet $A^1$ has three subsets, with the first subset containing two letters, and the others one letter. The letter probabilities for $A^1$ are given by $P^1 = [0.2985, 0.2985, 0.3000, 0.1030]$. According to the above procedure, the expansion for a five letter alphabet $A^2$ has tree subsets, with the first and second subsets containing two letters, and the other one letter. Its letter probabilities are $P^2 = [0.2985, 0.2985, 0.1500, 0.1500, 0.1030]$. The pseudo-redundancy for the alphabet is 0.1218. However, the optimal expansion for the five letter alphabet should have been a subset containing three letters and two subsets containing one letter, and the letter probabilities would be [0.199, 0.199, 0.199, 0.300, 0.103]. The pseudo-redundancy would be 0.0726.

From Eq. (9), it is clear that letters in the same subset of an alphabet must be equally likely to achieve minimum redundancy. Consider a general case in which the alphabet $A^k$ is partitioned into n subsets $[A_1^k, A_2^k, \ldots, A_n^k]$, and the alphabet $A^{k+1}$ expanded from $A^k$ is also partitioned into n subsets. If the difference between the two partitions is only that a particular subset $A_i^{k+1}$ in the latter partition has one more letter than the corresponding subset $A_i^k$ in the former case, the reduction in redundancy can be given as $$\Delta r = \log \frac{n+1}{n} - p_i \log \frac{l_i^{k+1}}{l_i^k}, \tag{10}$$

assuming that all letters in the same subset are equally likely for all subsets in both partitions. This results in the following iterative optimization algorithm.

(1) Set $k = 0$, $l_i^0 = 1$ for $1 \leq i \leq n$, $A_i^0 = [a_i]$
(2) Calculate $P_i \log (l_i^k + 1)/l_i^k$ for the subsets $A_i^k$, $1 \leq i \leq n$. Find the subset $A_i^k$ which maximizes $P_i \log (l_i^k + 1/l_i^k$.
(3) Form the partitions for $A^{k+1}$ in such a way that the number of letters in each subject is given by $$l_i^{k+1} = l_i^k + 1$$

and $$l_j^{k+1} = l_j^k \text{ for } i \neq j, 1 \leq i \leq n.$$

The letter probability for any letter $a_j^{k+1} \epsilon A_i^{k+1}$ is given by $P_i/l_k^{k+1}$, $1 \leq i \leq n$.

(4) Set $k = k + 1$, if $n + k$ is less than the maximum alphabet size desired, go to step 1. Otherwise, stop. Note that the pseudo-redundancy for a given alphabet size is a function of entropy only, and the increase in entropy for each step is given by $$p_i \log \frac{l_i^k + 1}{l_i^k}.$$

This increase is a function of the particular subset to be expanded, and is independent of previous expansions in other subsets. In addition, it is a monotonic decreasing function of $l_i^k$, as k increases, i.e., $$p_i \log \frac{l_i^{k+1} + 1}{l_i^{k+1}} < p_i \log \frac{l_i^k + 1}{l_i^k}.$$

Due to the independency among expansion in different disjoint subsets and the monotonic decreasing property, any possible expansion other than that selected by the algorithm cannot possibly contribute more entropy gain than the particular expansion selected by the algorithm at any given iteration. The optimal effect of the algorithm is therefore ensured.

The pseudo-redundancy at each step is given by $$r = \log (n + k) + \sum_{i=1}^{n} p_i \log p_i/l_i^k, \tag{11}$$

or $$r = \log (n + k) - h_{[A,P]} - \sum_{i=1}^{n} p_i \log l_i^k.$$

Taking the derivative of (10) with respect to $l_i^k$, we have $$\frac{\partial r}{\partial l_j^k} = \frac{\partial}{\partial l_j^k}[\log(n+k)] - \frac{p_i}{l_i^k}. \quad (12)$$

Since the increase in n+k is due to the expansion at the particular subset $A_j^k$ $$\frac{d(n+k)}{dl_j^k} = 1. \quad (13)$$

Substituting (12) into (11), we have $$\frac{\partial r}{\partial l_j^k} = \frac{1}{n+k} - \frac{p_i}{l_i^k}. \quad (14)$$

From eq. (14), it is clear that the reduction of pseudo-redundancy continues as along as the particular disjoint subset which it is selected satisfies $$\frac{p_j}{l_j^k} > \frac{1}{n+k} \quad (15)$$

Or, in other words, as long as all letters are not equally likely.

EXAMPLE II

The relative frequency of each letter in English, as given by F. Pratt, *Secret and Urgent*, Blue Ribbon Books, 1942, is shown in Table 1. Its entropy is 4.14 bits.

TABLE 1

| The Relative Frequency of each Letter in English | | | | | | | |
|---|---|---|---|---|---|---|---|
| e | 0.13105 | d | 0.03788 | b | 0.01440 |
| t | 0.01468 | l | 0.03389 | v | 0.00919 |
| a | 0.08151 | f | 0.02924 | k | 0.00420 |
| o | 0.07995 | c | 0.02758 | x | 0.00166 |
| n | 0.07098 | m | 0.02536 | j | 0.00132 |
| r | 0.06832 | u | 0.02459 | q | 0.00121 |
| i | 0.06345 | g | 0.01994 | z | 0.00077 |
| s | 0.06101 | y | 0.01982 | | |
| h | 0.05259 | p | 0.01982 | | |
| | | w | 0.01539 | | |

The redundancy of the English alphabet is 0.56 bits per letter. According to the iterative optimization algorithm outlined above, the optimal expansion for an alphabet of 64 letters is to replace "e" by 7 letters in the new alphabet, "t" by 6 letters, "a" by 5 letters, "o" by 5 letters, "n" by 4 letters, "r" by 4 letters, "i" by 4 letters, "s" by 4 letters, "h" by 3 letters, "d" by 2 letters, "l" by 2 letters, "f" by 2 letters, "c" by 2 letters, "m" by 2 letters, and substitute any other letter in English by a single letter in the new alphabet. The entropy for the new alphabet is 5.91 bits, and the pseudo-redundancy is 0.09 bits per letter. Therefore, the pseudo-redundancy of the new alphabet is only 1/6 of the redundancy of English. In other words, communication security, measured in terms of the unicity distance, is increased by a factor of 6 at the expense of about 20% bandwidth expansion. A similar expansion with an alphabet of 32 letters has a pseudo-redundancy of 0.32 bits per letter, which is about 4/7 of the redundancy of English, with practically no bandwidth expansion.

Figure 2:
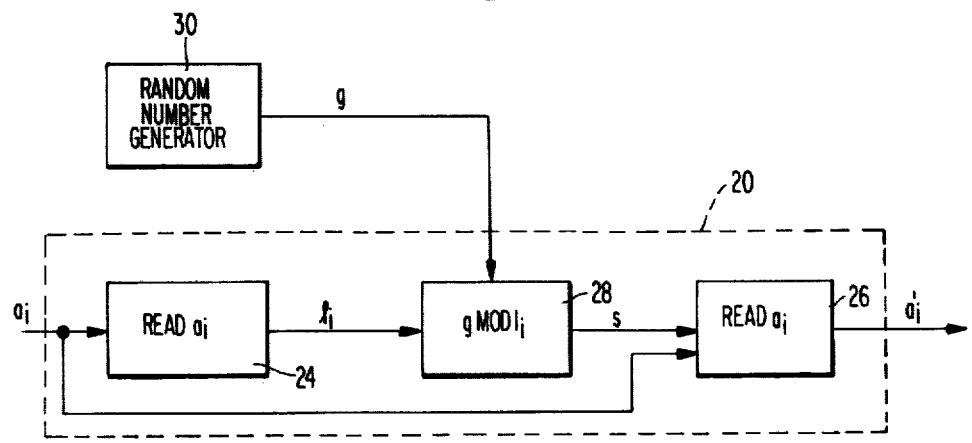
FIG. 2 is a block diagram of one example of the preprocessor shown in FIG. 1.

Shown in FIG. 2 is one example of the preprocessor 20 of FIG. 1. The preprocessor 20 includes a ROM 22 which, in turn, comprises look-up tables 24 and 26 and a modulo operator 28, and a random number generator 30. The message stream m containing the letters $a_i$ of the original alphabet are provided as inputs to the look-up tables 24 and 26. In the new alphabet A', there is a subset $A'_i$ which corresponds to each letter $a_i$ in the original alphabet. Each of these subsets contains $l_i$ letters. The look-up table 24 determines from the input letter $a_i$ the number of letters $l_i$ in the subset, and provides this as an input to the modulo operator 28. The modulo operator 28 performs the operation $s = g(\bmod l_i)$ which, as is known in the art, is the remainder of the division of g by the divisor $l_i$. For instance, if there are three letters in the subset $A'_i$ which may be substituted for the original $a_i$, the remainder of $(g/l_i)$ will be either 0, 1 or 2. Thus, the value s will indicate to the look-up table 26 which of the three substitution values is to be chosen.

The look-up table 26 is then addressed by the original letters $a_i$ to determine the subset of substitution values, and the particular substitution value is determined from the s value. The output of the look-up table 26 will then be a letter $a'_i$ belonging to the subset $A'_i$ of the new alphabet A' and representing the original letter $a_i$.

As is clear from the above description, the proper partitioning of the new alphabet can be determined without great difficulty, and once the partitioning has been determined, the implementation of the preprocessor and postprocessor are relatively straightforward. The preprocessing involves a random number generation and a table look-up, and the postprocessing involves only a table look-up. The present invention appears to be particularly useful in teletype communications. For instance, computer algorithms are known for using source statistics to successfully cryptanalyze any single substitution cipherer, i.e., a cipherer which merely substitutes a code character for an original character according to a one-to-one correspondence. With a slight bandwidth expansion and the multiple substitution according to the present invention, a single substitution cipherer can actually provide very high security. Prior to this invention, the alternative would have been a source coding scheme mapping the original letters into a block of digits of variable length in a smaller alphabet, and letter synchronization as well as buffer storages at both the source encoder and source decoder would be required. In situations such as teletype communications, a good source coding scheme which reduces the redundancy of the message stream of English letters to 0.09 bits per letter converts each letter to, on the average, 4.23 bits, which is a bandwidth reduction of about 15%. However, the complexity of such a source coding scheme may not be justified. If there is a bandwidth available for expansion, the multiple substitution according to the present invention would certainly be a more attractive alternative.

We claim:

1. In a method of maintaining communications security, including the steps of enciphering an input message signal comprising a plurality of characters $a_i$ to form a cryptogram signal, transmitting and receiving said cryptogram signal and decipering the cryptogram to recover the original input message signal, the improvement comprising:
preprocessing the message signal prior to enciphering by substituting for each character $a_i$ in the original alphabet A of the original message signal a character $a'_i$ in a subset $A'_i$ of a new alphabet A', which is assigned to said character $a_i$, to thereby form a new stream of characters $a'_i$, wherein the subset $A'_j$ for at least one character $a_j$ comprises at least two characters from which $a'_1$ is selected;

enciphering said stream of characters $a'_i$ to form said cryptogram signal;

deciphering the received cryptogram signal to obtain a stream of characters $a'_i$; and postprocessing the stream of characters $a'_i$ by substituting for each character $a'_i$ the character $a_i$ in the original message signal to which said character $a'_i$ corresponds.

2. The method according to claim 1, wherein the probability of occurrence of all characters $a'_i$ within a given subset $A'_i$ is substantially equal.

3. The method according to claim 1, wherein said substituting step comprises:

addressing a first memory with a first signal representing a character $a_i$ to determine said subset $A'_i$;

generating a substantially random second signal; and addressing said first memory with said second signal to determine which of the characters $a'_i$ is to be read out.

4. The method according to claim 3, wherein said generating step comprises:

receiving said characters $a_i$ in a second memory the output of which represents the number $l_i$ of characters $a'_i$ in said subset $A'_i$;

generating a substantially random number g; and generating said second signal representing the value g mod $l_i$.

5. The method according to any one of claims 1-4, further comprising, before said preprocessing step:

generating said new alphabet $A'$, comprising subsets $A'_i$ assigned to each original character $a_i$, by repeating the following steps until a maximum permissible new alphabet size has been achieved:

(1) Set $k=0$, $l_i^0 = 1$ and $A_i^0 = [a_i]$ where n is the number of characters in the original alphabet A, $1 \leq i \leq n$, $l_i^k$ is the number of characters in a subset $A_i^k$ and $A_i^k$ is a subset in alphabet $A^k$ which corresponds to original character $a_i$.

(2) Calculate $p_i \log l_i^k + 1/l_i^k$ for the subsets $A_1^k$, $1 \leq i \leq n$. Find the subset $A_j^k$ which maximizes $p_i \log l_i^k + 1/l_i^k$.

(3) Form a new alphabet $A^{k+1}$ in such away that the number of characters in each subject $A_i^{k+1}$ is given by $$l_j^{k+1} = l_j^k + 1$$

and $$l_i^{k+1} = l_i^k \text{ for } i \neq j, \ 1 \leq i \leq n.$$

and such that the probability of occurrence of any character within subset $A_i^{k+1}$ is given by $p_i/l_i^{k+1}$ for $1 \leq i \leq n$, where $p_i$ is the probability of occurrence of $a_i$.

6. In a communications security system of the type having a message source for providing a message having characters $a_i$ belonging to an alphabet A, an encipherer for enciphering said message to form a cryptogram, and a deipherer for deciphering said cryptogram to recover the enciphered message, the improvement comprising:

preprocessing means between said message source and encipherer for receiving said message and substituting for each character $a_i$ a new character $a'_i$ belonging to a subset $A'_i$, of a new alphabet $A'$, which is assigned to said character $a_j$, at least one of said subsets $A'_j$ having plural characters $a'_j$;

said encipherer enciphering the characters $a'_i$ to form said cryptogram;

said decipherer deciphering said cryptogram to obtain said characters $a'_j$; and postprocessing means for receiving the decipherer output and substituting for each letter $a'_i$ the corresponding character $a_j$.

7. The system according to claim 6, wherein the probability of occurrence of all characters $a'_i$ within a given subset $A'_i$ is substantially equal.

8. The system according to claim 6, wherein said preprocessing means comprises:

a first memory addressed by a first signal representing a character $a_i$ to determine said subset $A'_i$, said first memory being also addressed by a second signal to determine which of the characters $a'_i$ within said subset $A'_i$ is to be read out; and generating means for generating a substantially random second signal for addressing said first memory.

9. The system according to claim 8, wherein said generating means comprises:

second memory means for receiving said characters $a_i$ and providing an output representing the number $l_i$ of characters $a'_i$ in said subset $A'_i$;

means for generating a substantially random number g; and modulo operator means for receiving $l_i$ and g and providing an output representing the value g mod $l_i$, the output of said modulo operating means comprising said second signal.

* * * * *